No. 686,455. Patented Nov. 12, 1901.
E. HILL.
MEASURING INSTRUMENT.
(Application filed Jan. 2, 1901.)
(No Model.)
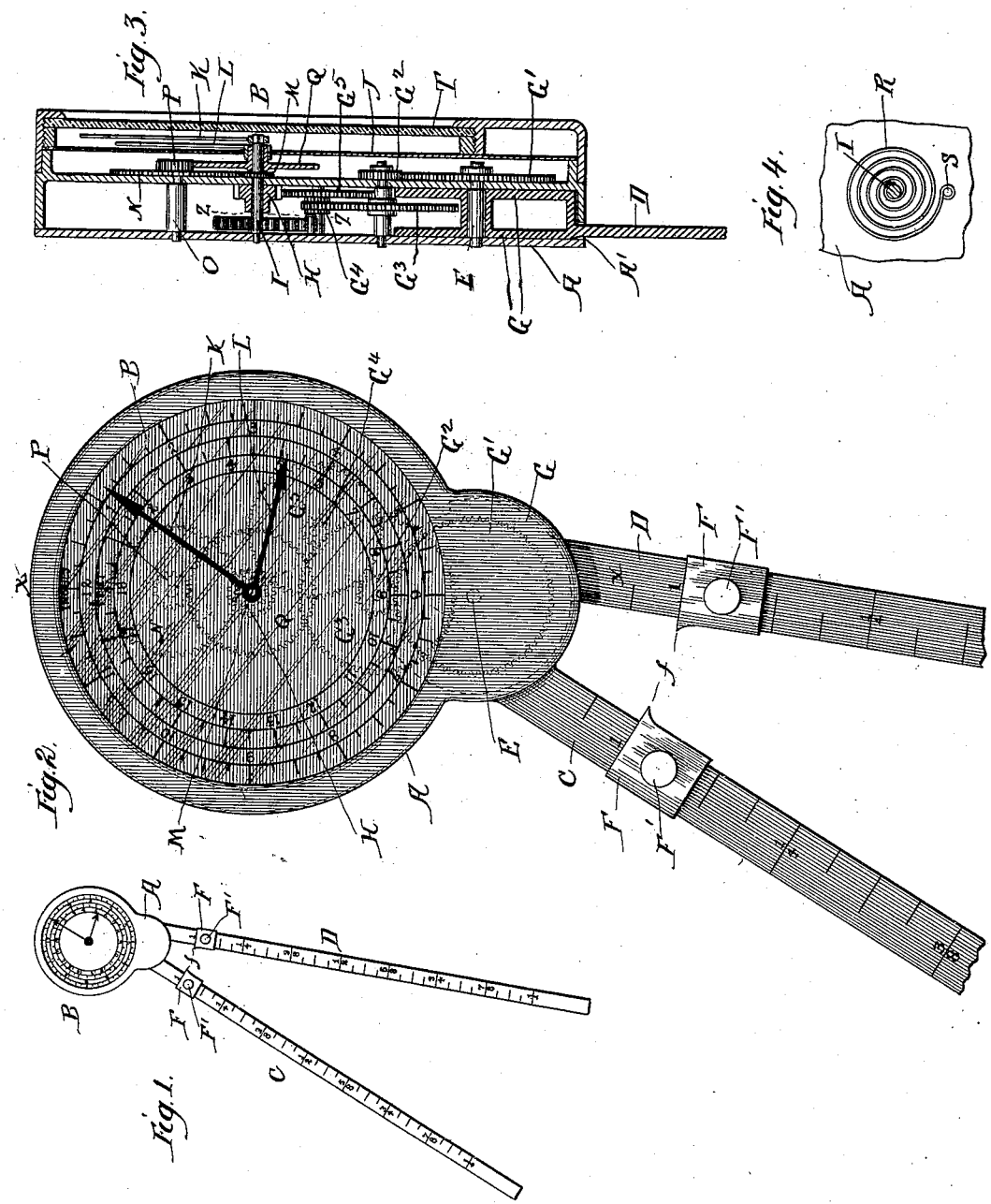
Witnesses:
H. B. Hallock
L. H. Morrison
Inventor
Edgar Hill
by
W. Preston Williamson
Atty.

UNITED STATES PATENT OFFICE.

EDGAR HILL, OF PHILADELPHIA, PENNSYLVANIA.

MEASURING INSTRUMENT.

SPECIFICATION forming part of Letters Patent No. 686,455, dated November 12, 1901.

Application filed January 2, 1901. Serial No. 41,772. (No model.)

*To all whom it may concern:*

Be it known that I, EDGAR HILL, a citizen of the United States, residing at Philadelphia, county of Philadelphia, and State of Pennsylvania, have invented a certain new and useful Improvement in Measuring Instruments, of which the following is a specification.

My invention relates to a new and useful improvement in measuring instruments, and has for its object to provide an instrument of this character by which a drawing made upon a reduced scale can be measured and the full-sized measurement of the distance measured upon the drawing will be indicated upon an indicator carried by said instrument.

Another object of my invention is to provide the instrument with movable pointers, so that a drawing made to any scale can be measured.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 represents a front elevation of my device; Fig. 2, an enlarged front elevation of the upper portion of the instrument. Fig. 3 is a section on the line $x$ $x$ of Fig. 2, and Fig. 4 is a section on the line $z$ $z$ of Fig. 3.

In carrying out my invention as here embodied A represents a casing, which has the dial B located upon the front thereof.

C is a leg, which is formed with or secured to the casing A. D is another leg, which is pivoted in the casing at the point E. Each of these legs has a slide F thereon, these slides having the points $f$ thereon. These slides or pointers F can be set at any point along the legs by means of the set-screws F'. The upper end of the leg D upon the interior of the casing A has secured to or formed with it the disk-shaped portion G, which bears against the inner faces of both the front and rear portions of the casing and is secured to the pivot E, which is journaled in the casing. The purpose of this disk-shaped portion is to give broad bearing-surface for the arm D. The pivot E has secured to it and adapted to revolve therewith the gear-wheel G', which is adapted to multiply and communicate motion to the gear-wheel H, mounted upon the arbor I, through the train of gears composed of the gear-wheels $G^2$, $G^3$, $G^4$, and $G^5$.

J is a dial, which is secured upon the front of the casing in any suitable manner, and this dial has indicated thereon a double circle of graduations, the outer circle representing inches and the inner circle feet. The arbor I passes outward through the front of the casing and through the dial and has secured to its extreme outer end the long hand K. This hand is of sufficient length to point to the outer row of graduations upon the dial, and thus indicates the inches. The legs C and D have graduations represented thereon which represent fractions of an inch. This is for the purpose of setting the pointers F to whatever fraction of a foot the scale-drawing is made. Thus if the drawing is made to one-eighth-of an-inch scale the pointers F will be set even with the graduation which is marked "one-eighth" upon the legs. The relative sizes of the gears composing the train of gears is such that when the pointers F are separated a distance which represents one foot upon the scale-drawing the hand K will be caused to rotate a sufficient distance to indicate one foot upon the dial. Thus if it is desired to measure a drawing made to one-eighth-of-an-inch scale the pointers are set to the graduation representing one-eighth upon the legs and will be in position as shown in the drawings, and when these pointers would be separated so that the distance between the points $f$ would be one-eighth of an inch one foot would be indicated upon the dial, and if three-eighths of an inch were measured three feet would be represented on the dial, and so on until the limit of the measurement of the instrument would be reached. Every time the hand K makes one revolution it will indicate twelve inches or one foot, and I prefer to provide mechanism by which another hand L will be caused to rotate, so that every time the hand K makes one revolution the hand L will indicate one foot upon the dial. I cause this hand L to revolve in the well-known manner employed in clock-movements by providing a gear-wheel M, which is secured to the arbor I upon the front of the casing. This gear-wheel M meshes with a larger gear-wheel N, which is secured to an arbor O, journaled in the casing, and this gear-wheel M has secured to it and adapted to revolve therewith a small gear P, which in turn meshes with a larger gear-wheel Q, which is journaled loosely upon the arbor I. The hand L is secured upon the hub of the gear-wheel q and is therefore caused to revolve therewith. This hand L is shorter than the hand K and is adapted to point to the second row of graduations upon the dial, which indicates the feet. Where the leg D passes out of the casing A, I provide a slot A', which serves to limit the movement of the leg and guide the same.

Of course it will be understood that the dial may be divided up in a different way from that shown in the drawings. As, for instance, the outer circle of graduations could represent two feet and the inner circle of graduations would have every alternate foot represented thereon. In such case the relative sizes of the gears composing the train would have to be changed accordingly.

In instruments where very exact measurements would be required the slight amount of lost motion which might be caused by reason of the use of gears might cause a slight inaccuracy in the measurement. To overcome this disadvantage, I provide a coil-spring R, one end of which is secured to the arbor I and the other to the casing A at the point S. This spring R is coiled in such a manner that when the legs of the instrument are separated and the arbor I caused to revolve the spring will be tightened, and this will give the gear H a retrograde tendency, which will keep its teeth always against one face of the gear-teeth in the gear $G^5$, and thus prevent any lost motion. This spring R will be made very light, so as not to cause the legs C and D to come together after they have been separated. T is a glass placed over the dial for the protection of the same.

The advantages of my invention are that it saves mental work and time in measuring up a scale-drawing, for the method employed now for making a scale-drawing is to measure such drawing and then multiply such measurements by the fraction of the foot to which the drawing is made. With my instrument when the measurement is made it is indicated at once upon the dial, and therefore requires no calculation and no great amount of skill, so that a man having comparatively little training in measuring up a scale-drawing could with this instrument undertake the same with a degree of confidence which he could not have if he had to measure the same with a scale or ordinary rule and do the calculation himself.

A further advantage in the use of my instrument is that no mistakes can be made, as might occur when the measurement had to be multiplied or calculated in another manner.

I do not wish to be limited to the exact construction here shown, as slight modifications could be made without departing from the spirit of my invention—as, for instance, the pointers which I have shown sliding upon the legs are of the simplest construction, and it is obvious that they could be made in other forms without departing from the invention.

Having thus fully described my invention, what I claim as new and useful is—

1. The combination in a device of the character described, a casing having a leg formed therewith, a leg pivoted to the casing, pointers adjustable on the legs, graduations for indicating the scale of the drawing to be measured, a dial having graduations, two hands pivoted in the center of the dial, one of which is adapted to record the revolutions of the other, an arbor, a gear-wheel on the arbor connected thereto, a coil-spring on the arbor so set as to be tightened when the legs are separated, and suitable gearing operated by the movement of the pivoted leg whereby the hands are moved, substantially as described.

2. The combination in a device of the character described, a casing A, a leg C formed with or secured to said casing, a leg D pivoted in said casing, pointers located upon each of said legs and adapted to be adjusted along the same, means for clamping these pointers in any position, graduations formed upon each of the legs for the purpose of setting the pointers according to the scale of the drawing to be measured, a dial located upon the front of the casing, a double circle of graduations represented upon said dial, two hands or indicators pivoted in the center of the dial, one hand adapted to record the revolutions of the other hand, a train of gears adapted to actuate said hands, an initial gear G secured to and to be actuated by the pivoted leg D adapted to mesh with and actuate said train of gears, and a coil-spring, one end being secured to the central arbor I and the other end to the casing in such a manner that the spring will be tightened when the two legs are spread, substantially as described and for the purpose specified.

In testimony whereof I have hereunto affixed my signature in the presence of two subscribing witnesses.

EDGAR HILL.

Witnesses:
MARY E. HAMER,
L. W. MORRISON.